May 26, 1925.
A. EDMUNDSON
1,539,043
TENSION MECHANISM FOR LOOMS
Filed July 7, 1924　　2 Sheets-Sheet 1
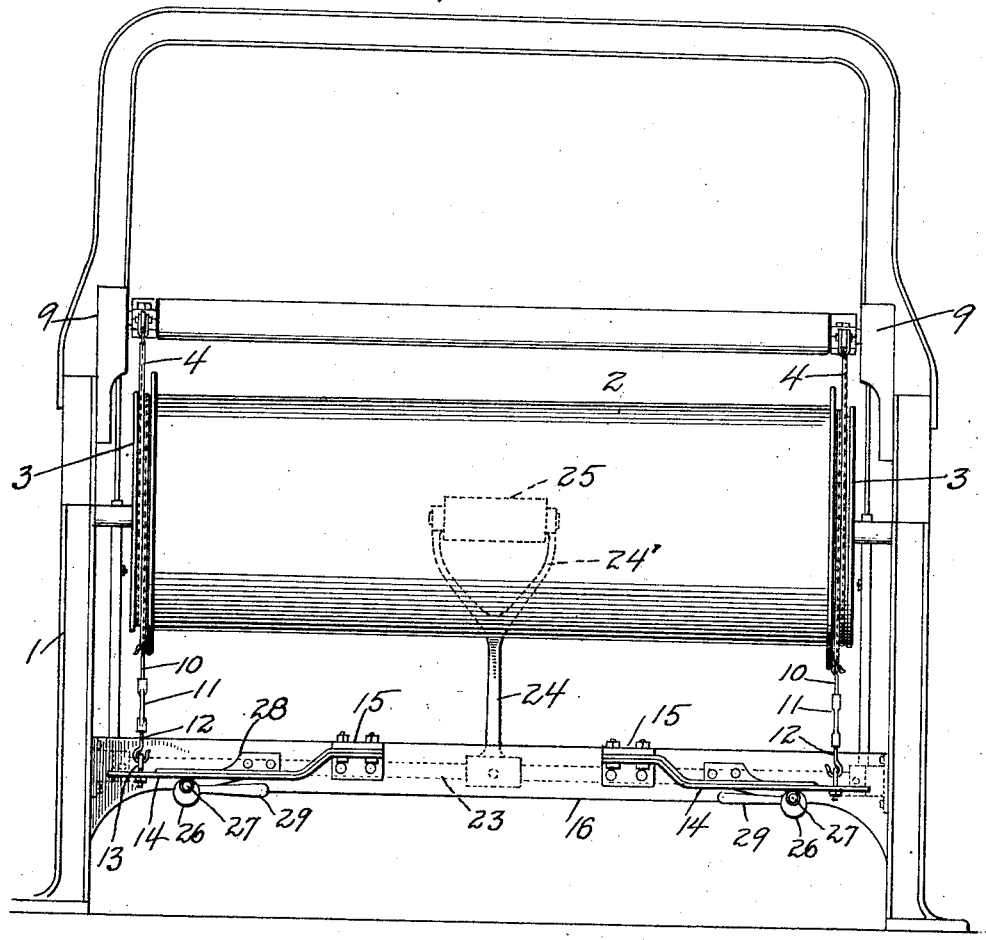
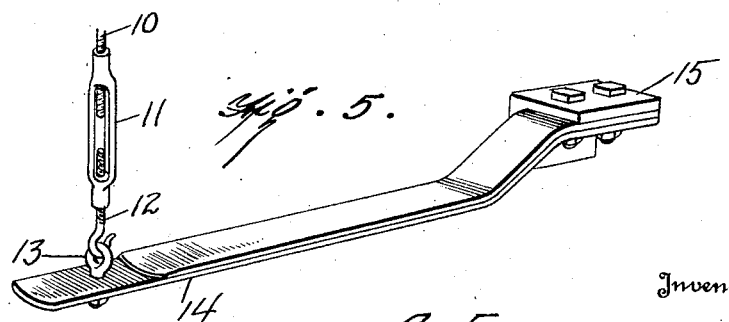
Inventor
A. EDMUNDSON,
By
Attorneys May 26, 1925.
A. EDMUNDSON
TENSION MECHANISM FOR LOOMS
Filed July 7, 1924
1,539,043
2 Sheets-Sheet 2
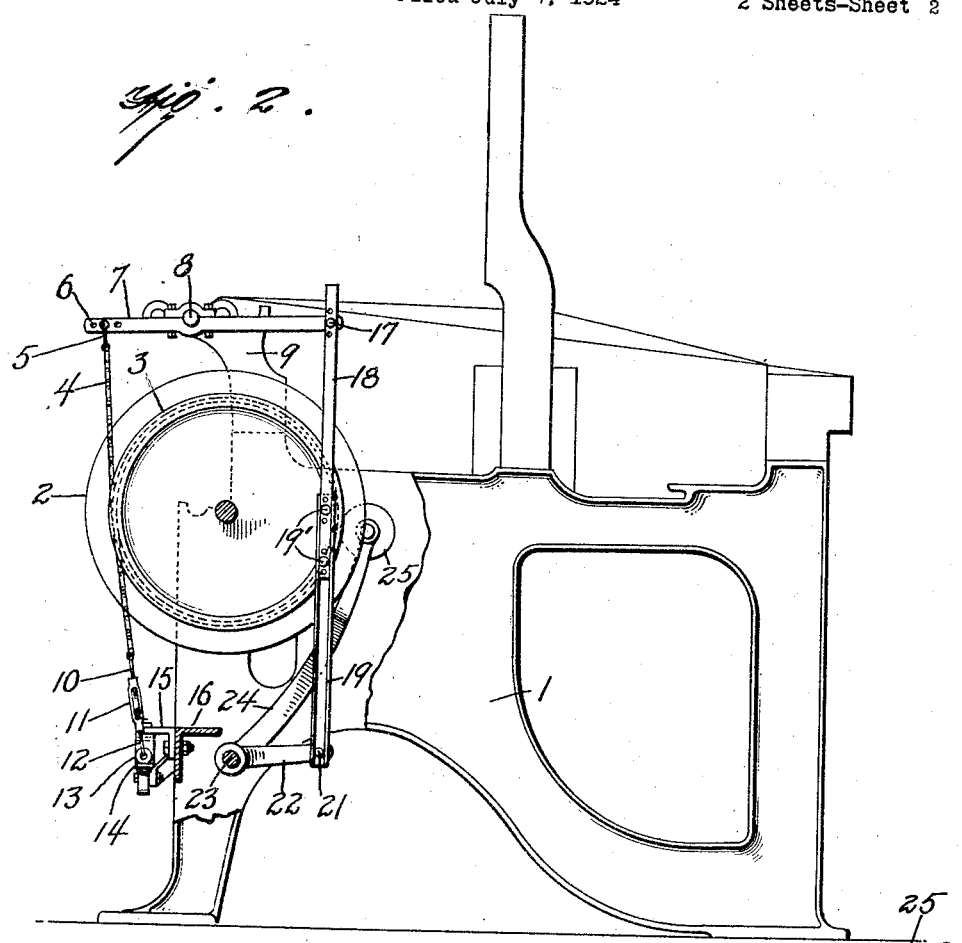
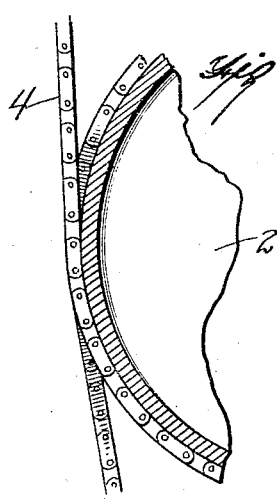
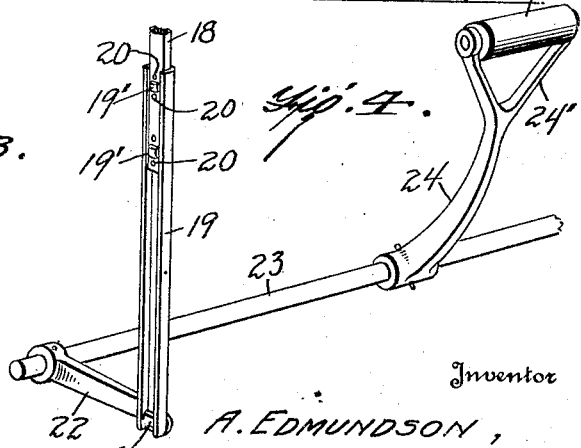
Inventor
A. EDMUNDSON,
By
Attorneys Patented May 26, 1925.

1,539,043

UNITED STATES PATENT OFFICE.

ALFRED EDMUNDSON, OF NEW BEDFORD, MASSACHUSETTS.

TENSION MECHANISM FOR LOOMS.

Application filed July 7, 1924. Serial No. 724,634.

*To all whom it may concern:*

Be it known that I, ALFRED EDMUNDSON, residing at New Bedford, in the county of Bristol, in the State of Massachusetts, citizen of the United States, have invented certain new and useful Improvements in Tension Mechanism for Looms, of which the following is a specification.

The object of this invention is to provide a novel tension mechanism for looms, which is characterized by extreme simplicity of construction and efficiency in operation.

The invention, in its preferred embodiment, is shown in the accompanying drawings, in which like reference characters designate corresponding parts throughout the several views. Briefly referring to the drawings:

Figure 1 is a view in rear elevation of a loom equipped with my invention;

Figure 2 is a view in end elevation, partly in section, thereof, part of the loom-frame being broken away;

Figure 3 is a fragmentary detail sectional view of the warp-beam and one of the friction chains passing therearound;

Figures 4 and 5 are fragmentary detail views, in perspective, of portions of the tension-mechanism.

Referring, now, in detail to the drawings: 1 designates the frame of the loom, and 2 the warp-beam, which is of usual construction, having a lateral brake-drum, formed by peripherally-grooved or channeled ends 3, 3, around which pass flexible brake-elements, preferably chains 4, 4, one end of each of which carries a hook 5 adapted to engage either one of a plurality of holes 6 in one end of a lever 7 fulcrumed intermediately of its ends on a shaft 8 supported in bearings in the members 9, 9 of the frame 1. The other end of each of the chains is engaged by a hook 10, having a threaded shank engaged by one end of a turn-buckle 11, the other end of which engages the threaded end of a similar hook 12, which, in turn, is engaged with the eye of an eye-bolt 13 carried toward the free end of a leaf-spring 14, the other end of the latter being held in a bracket 15 bolted to an angle bar 16 secured at its ends to the upright members of the frame 1.

The end of each lever 7, opposite the holes 6, is pivotally connected, as by a pin 17, to the upper end of a link composed of two telescoping sections 18, 19, adjustably secured together by bolts 19' passing through alined openings therein. A plurality of such openings 20 are provided in the section 18, so as to provide for relative adjustment of the two sections. The lower end of the link 18—19 is pivotally connected, at 21, to one end of a crank 22, the other end of which is pinned fast to a rotatable shaft 23 supported at its ends in bearings in the frame 1.

An arm 24 is pinned fast at its lower end to the shaft 23, intermediate its ends, said arm having, at its other or upper end, a yoke 24' supporting a feeler roller 25 bearing against the periphery of the warp-beam 2.

It will be noted that the tension on the chains 4, 4 and the frictional contact of the roller 25 with the warp-beam 2 may be increased or diminished by rotating the turn-buckles 11, 11 in the proper direction.

To release the tension of the chains 4, 4, without disconnecting the hooks 12, 12 from the eye-bolts 13, 13 of the springs 14, 14, I have provided, beneath each leaf-spring 14, a cam 26 eccentrically pivoted, at 27, to the free end of a bracket 28 secured at one end to the angle-bar 16. Each cam is provided with a handle 29, so that, by pulling the latter downward, the cam 26 will flex the spring 14 upward.

Having thus fully described my invention, the advantages thereof will be apparent, especially to those skilled in the art to which it pertains.

While I have described with some particularity a particular concrete embodiment of my inventive conception, it will be understood that modifications, especially in detail, may be made, within the scope of the appended claims, without departing from the spirit and substance of the invention, or necessarily sacrificing any of its advantages.

What I claim as new and desire to secure by Letters-Patent of the United States is:

1. In tension-mechanism for looms, the combination of the warp-beam having lateral brake-drums, flexible brake-elements passing around said brake-drums, levers disposed transversely above said warp-beam and fulcrumed intermediately of their ends, the upper ends of said brake-elements being secured to said levers at one end thereof, leaf-springs secured at one end to a stationary support and at the other end to the lower ends of said brake-elements, a feeler-member including a roller adjacent the periphery of said brake-beam and moving inward, as the warp-beam decreases in diameter, to rock said levers to change the braking effect of said brake-elements, and connections between the feeler-member and the other end of said levers.

2. In tension-mechanism for looms, the combination of the warp-beam having lateral brake-drums, flexible brake-elements passing around said brake-drums, levers disposed transversely above said warp-beam and fulcrumed intermediately of their ends, the upper ends of said brake-elements being secured to said levers at one end thereof, leaf-springs secured at one end to a stationary support and at the other end to the lower ends of said brake-elements a feeler-member comprising an arm and a roller carried thereby and disposed adjacent the periphery of said warp-beam and moving inward, as the warp-beam decreases in diameter, to rock said levers to change the braking effect of said brake-elements, a rock-shaft to which said arm is rigidly secured, and connections between the other end of said levers and said rock-shaft.

3. In tension-mechanism for looms, the combination of the warp-beam having lateral brake-drums, flexible brake-elements passing around said brake-drum, levers disposed transversely above said warp-beam and fulcrumed intermediately of their ends, the upper ends of said brake-elements being secured to said levers at one end thereof, leaf-springs secured at one end to a stationary support and at the other end to the lower ends of said brake-elements, a feeler-member comprising an arm and a roller carried thereby and disposed adjacent the periphery of said warp-beam and moving inward, as the warp-beam decreases in diameter, to rock said levers to change the braking effect of said brake-elements, a rock-shaft to which said arm is rigidly secured, cranks rigidly secured to said rock-shaft, and links connecting said cranks and the other end of said levers.

4. The tension-mechanism defined by claim 3, each of said links comprising two sections adjustably secured together.

5. In tension-mechanism for looms, the combination of the warp-beam having lateral brake-drums, flexible brake-elements passing around said brake-drums, levers disposed transversely above said warp-beam and fulcrumed intermediately of their ends, the upper ends of said brake-elements being secured to said levers at one end thereof, leaf-springs secured at one end to a stationary support and at the other end to the lower ends of said brake-elements, a feeler-member including a roller adjacent the periphery of said brake-beam and moving inward, as the warp-beam decreases in diameter, to rock said levers to change the braking effect of said brake-elements, connections between the feeler-member and the other end of said levers, and cams disposed beneath said leaf-springs for independently changing the braking effect of said brake-elements.

In testimony whereof, I hereunto affix my signature.

ALFRED EDMUNDSON.